(12) United States Patent
Boussard et al.

(10) Patent No.: US 8,144,839 B2
(45) Date of Patent: Mar. 27, 2012

(54) COMMUNICATION METHOD AND SYSTEM FOR DETERMINING A SEQUENCE OF SERVICES LINKED TO A CONVERSATION

(75) Inventors: Mathieu Boussard, Nozay (FR); Alain Pastor, Nozay (FR)

(73) Assignee: Alcatel Lucent, Paris (FR)

( * ) Notice: Subject to any disclaimer, the term of this patent is extended or adjusted under 35 U.S.C. 154(b) by 363 days.

(21) Appl. No.: 12/556,319

(22) Filed: Sep. 9, 2009

(65) Prior Publication Data

US 2010/0086110 A1  Apr. 8, 2010

(30) Foreign Application Priority Data

Sep. 11, 2008  (FR) ...................................... 08 56129

(51) Int. Cl.
*H04M 1/64* (2006.01)
*G06F 3/16* (2006.01)

(52) U.S. Cl. ..................................... 379/88.04; 715/728

(58) Field of Classification Search .... 379/88.04–88.25, 379/93.01, 202.01; 709/206, 202, 203, 219, 709/221, 246, 204; 715/200, 239; 455/418, 455/466, 414, 550.1; 704/251, 270, 257, 704/9

See application file for complete search history.

(56) References Cited

U.S. PATENT DOCUMENTS

| | | | |
|---|---|---|---|
| 7,006,973 B1 * | 2/2006 | Genly | 704/275 |
| 7,039,722 B1 * | 5/2006 | Fuisz et al. | 709/246 |
| 7,925,506 B2 * | 4/2011 | Farmaner et al. | 704/257 |
| 2003/0048880 A1 * | 3/2003 | Horvath et al. | 379/88.01 |
| 2005/0137877 A1 | 6/2005 | Oesterling et al. | |
| 2005/0144013 A1 * | 6/2005 | Fujimoto et al. | 704/277 |
| 2007/0071187 A1 * | 3/2007 | Apreutesei et al. | 379/93.01 |
| 2010/0142406 A1 * | 6/2010 | Goring et al. | 370/254 |
| 2010/0174713 A1 * | 7/2010 | Baessler et al. | 707/736 |
| 2010/0241978 A1 * | 9/2010 | Genovese et al. | 715/765 |
| 2011/0228915 A1 * | 9/2011 | Chen et al. | 379/88.04 |

FOREIGN PATENT DOCUMENTS

| | | |
|---|---|---|
| WO | WO 2004/029831 A2 | 4/2004 |
| WO | WO 2006/102030 A1 | 9/2006 |

OTHER PUBLICATIONS

French Search Report, Mar. 31, 2009.

* cited by examiner

*Primary Examiner* — Davetta W Goins
*Assistant Examiner* — Mohammad Islam
(74) *Attorney, Agent, or Firm* — Fay Sharpe LLP

(57) ABSTRACT

The present invention concerns a method for determining a sequence of services linked to a conversation in which a user (12) takes part from a communication system (1), as well as the associated communication system (1). According to the invention, the method includes the following stages:

retrieval (E2) of all the expressions used during the conversation;

semantic analysis (E31) of the expressions retrieved;

selection (E32) of a plurality of services from a list of services previously saved, based on at least said semantic analysis, with each service of said list able to be launched from said communication system (1);

contextual analysis (E33) of the expressions used during the conversation;

determination of a sequence of said services selected based on the contextual analysis;

display (E4) on said communication system (1) of the sequence of services selected.

8 Claims, 2 Drawing Sheets

COMMUNICATION METHOD AND SYSTEM FOR DETERMINING A SEQUENCE OF SERVICES LINKED TO A CONVERSATION

The present invention relates to the management of information exchanged during a conversation, in particular to a method and a system of communication for determining a sequence of services linked to a conversation in which a user takes part from a communication system.

During a telephone conversation or a conversation held via an instant messaging software (also known as a "chat"), it is common for correspondents to assign tasks relating to the subjects they are discussing.

For example, when a conversation between two correspondents concerns the preparation of an event such as an excursion to a tourist site, the correspondents may assign tasks during the conversation relating to the organisation of the excursion. One of the correspondents may therefore be responsible, following the conversation, for consulting the weather forecasts for the site, searching for a route to get to the site, reserving train tickets or contacting a third party to ask them whether they are interested in such an excursion.

Traditionally, to consult the information requested or carry out the tasks assigned during the conversation, the correspondents activate services using computer applications, such as their Web browser, installed in their communication system.

In the above example, the correspondent responsible for finding out about the weather can open the Web browser installed on their communication system and enter a URL (Uniform Resource Locator) corresponding to a weather forecasting website. Furthermore, if this correspondent also has to reserve transport tickets, they can enter a new URL in the Web browser corresponding to a website for reserving tickets online. Likewise, if the correspondent has offered or has been asked during the conversation to send an e-mail to a friend to invite them to join the excursion, they can activate an electronic mail service available from their communication system in order to be able to send an e-mail.

However, the correspondent must not forget the tasks they have been assigned during the conversation. The correspondent does not yet know or is not yet thinking about running the services available from their communication system, allowing them to carry out their tasks assigned during the conversation.

Furthermore, if the correspondent has determined the adapted services, in order to launch them, they must open a specific application from their communication system and manually enter information which has already been mentioned during the conversation. This operation is all the more tiresome as it has to be carried out for each time a correspondent requires a new service to carry out a task.

The current invention aims to facilitate the execution of the tasks a user has been assigned during a conversation.

With this in mind, a first objective of the invention concerns a method for determining a sequence of services linked to a conversation in which a user takes part from a communication system, characterised in that it includes, once the conversation is completed, the following stages:
retrieval of all the expressions used during the conversation;
semantic analysis of the expressions retrieved;
selection of a plurality of services from a previously saved list of services, based on at least said semantic analysis, with each service of said list able to be launched from said communication system;
contextual analysis of the expressions used during the conversation;
determination of a sequence of said services selected based on said contextual analysis;
display on said communication system of the sequence of services selected.

A second objective of the invention concerns a communication system comprising means of allowing a user to hold a conversation, characterised in that it also comprises:
a means of storage for a list of services liable to be launched from at least said communication system;
a natural-language analysis server able to:
select a plurality of services from the list of services stored, based on at least one semantic analysis of all the expressions used during the conversation;
determine a sequence of services selected based on a contextual analysis of all the expressions used during the conversation;
means of displaying the sequence of the services selected.

Other characteristics and benefits of the invention will become apparent upon reading the following description, with reference to the attached drawings, in which.

Figure 1:
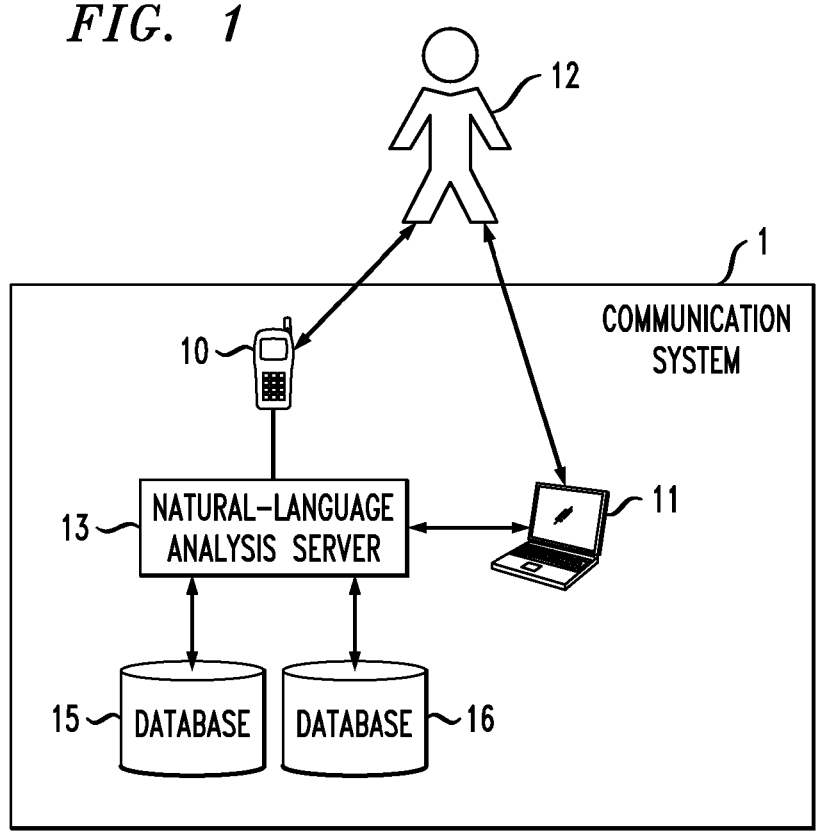
FIG. 1 shows in diagram form a preferred architecture of different elements making up a communication system, as well as their interactions with a view to the determination of a sequence of services according to the invention.

The communication system 1, as shown in FIG. 1, traditionally comprises a set of terminals 10, 11 such as a telephone 10 or a computer 11 connected to a screen and from which a user 12 can hold a conversation on the telephone or via an instant messaging client.

Such a communication system 1 can also serve as an access point to services. Therefore, for example, when a Web browser is installed on the computer 11, a user 12 of the communication system 1 can, among other things, access weather forecast services, consult bank accounts or reserve transport tickets from this computer 11, with such services being available on Internet sites accessed from the Web browser.

Likewise, if an Outlook® type messaging client is installed on the communication system 1, the user 12 may access a messaging service and therefore receive or send electronic messages from or to other users.

The possibility may also be envisaged of launching and then running a telephone conference service from one of the terminals 10, 11 of the communication system 1.

In accordance with the method of the invention, when a user 12 has held a conversation, it is possible, at the end of the conversation, to retrieve and send all the expressions used during the conversation to a natural-language analysis server 13. This retrieval stage may be carried out following a voice conversation via a telephone 10 or following a qualified written conversation held via an installed instant messaging client 14, for example on the terminal 11 of the communication system 1.

The natural-language analysis server 13 then carries out a semantic analysis of the expressions retrieved and selects a plurality of services from among a list of services previously saved based on the semantic analysis carried out. Each service of the list may consist of one of the aforementioned services liable to be launched and/or run from the communication system 1.

Once the services are selected, the natural-language analysis server 13 carries out a contextual analysis of the expressions used during the conversation. By contextual analysis we refer to the analysis of an expression based on the terms used before or after said expression in the conversation, unlike the semantic analysis in which only the meaning of the expression is analysed.

Following this contextual analysis, a determination of a sequence of services selected is carried out based on the result of the contextual analysis. The sequence determined is then displayed on an interface of the communication system 1.

Figure 2:
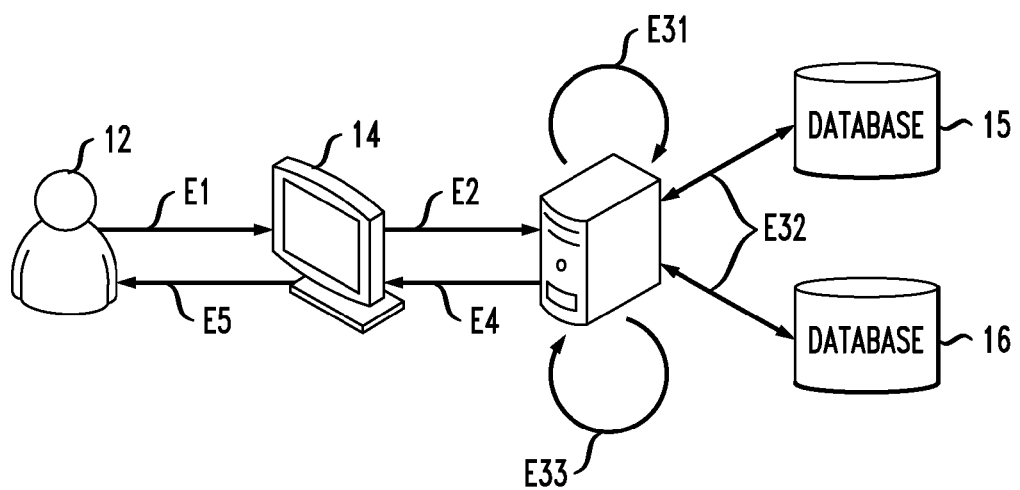
FIG. 2 represents in diagram form different interactions between a user, a messaging client and a natural-language analysis server of a communication system according to a preferred mode of the invention.
Figure 3:
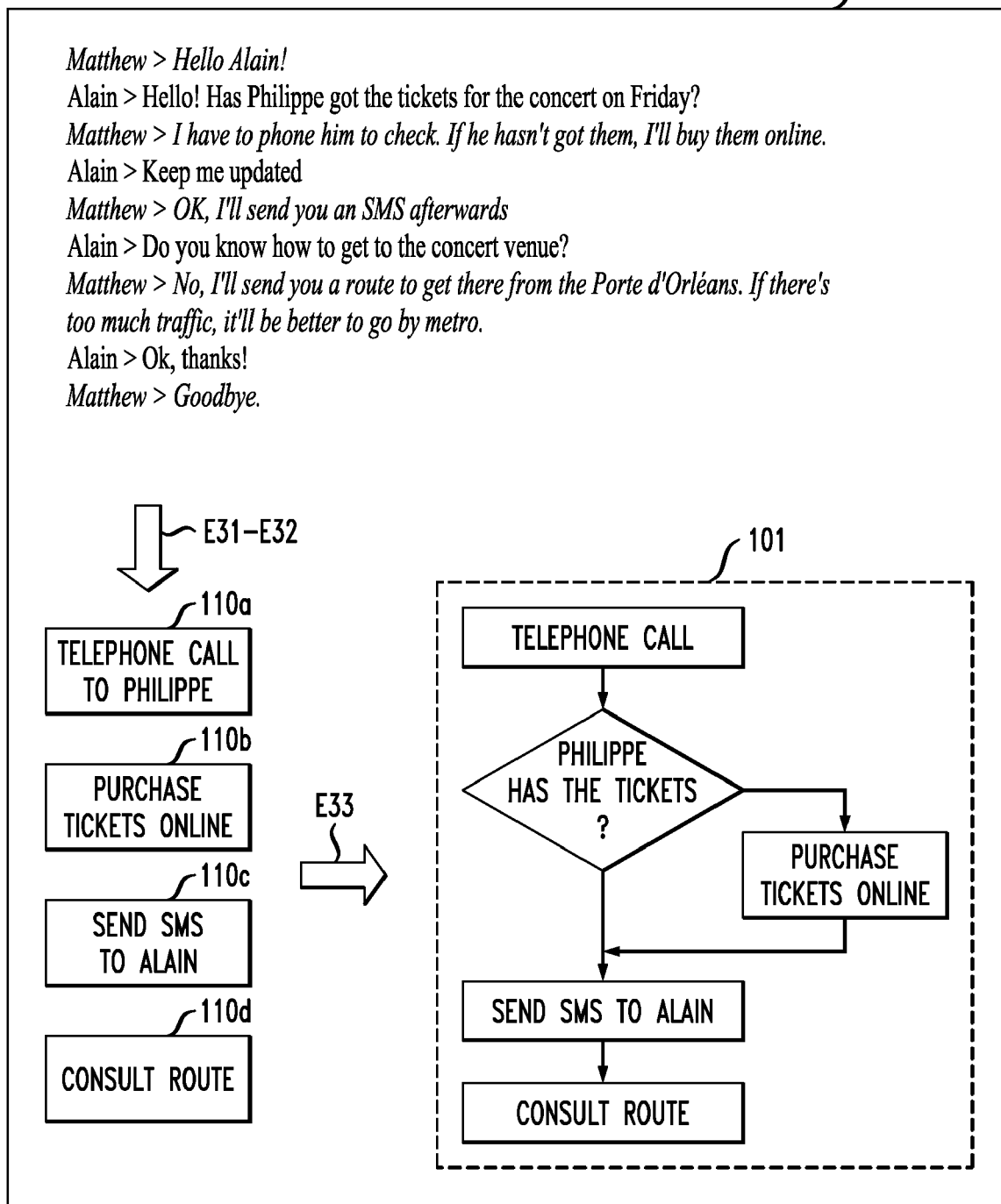
FIG. 3 represents a graphic interface of an instant messaging client on which a sequence of services is displayed in accordance with the invention.

In reference to FIGS. 2 and 3, the different features of the communication system and the different stages implemented to determine a sequence of services linked to a conversation having been held will be detailed in the event that the conversation is held from an instant messaging software.

As shown in FIGS. 2 and 3, a user 12 is in conversation with at least one other user via an instant messaging software. Such a conversation is initialised by the opening of a shared session from the instant messaging clients respectively installed on the communication systems of the users.

For a user, the conversation then involves firstly entering and successively sending expressions from the interface of their instant messaging client and secondly receiving on the interface of their client the expressions entered and sent by the other participants in the conversation. The expressions entered and received are traditionally words or sentences. Traditionally, one of the display zones 100 making up the interface of the instant messaging client is intended to display all of the expressions sent and received by the user during the conversation.

FIG. 3 shows a part of the graphic interface of a messaging client from which a user named Matthieu has held a conversation with a second user named Alain. All of the expressions exchanged during the conversation are displayed on the display zone 100 of the interface.

In accordance with the method of the invention, at the end of the conversation Matthieu can trigger a feature for scheduling tasks from his instant messaging client (stage E1 in FIG. 2). All of the expressions displayed in the display zone 100, which shows all of the expressions used during the conversation, are then sent to a natural-language analysis server 13 (stage E2 in FIG. 2).

More specifically, the server 13 then carries out a semantic analysis of the expressions which it has been sent (stage E31 in FIG. 2), in order to first isolate relevant terms which can be used firstly to determine the tasks assigned to the user during the conversation and secondly to determine the services from which the user is likely to carry out these tasks.

For example, if the server 13 receives all of the expressions of the conversation held between the users Matthieu and Alain, the semantic analysis of the expressions "I have to phone him", "I'll buy them online", "I'll send you an SMS" (Short Message System) and "I'll send you a route" by the server 13 is used to determine that Matthieu (user 12) has to carry out four tasks after the conversation. Specifically, the user must:

make a telephone call;
make a purchase online;
send an SMS;
send a route;

The semantic analysis is also used to select services from which the user may carry out the tasks they have been assigned. To do this, the natural-language analysis server 13 may be connected to a database 15 which we will call the service semantic reference system. This reference system 15 may contain a list of services which can be launched and/or run from the communication system 1 of the user 12. Each service included in the reference system may be associated with:

a tree structure representation for which each leaf corresponds to a term;
an item (button, hyperlink, tab or any other graphical element which can be displayed on the interface of the instant messaging client) intended to be displayed on the interface of the instant messaging client if the service with which it is associated is selected;
meta-data comprising a set of parameters required to launch the service from the communication system 1.

Each leaf of the tree structure representation may correspond to a semantic term which may have an associated elementary score. This elementary score represents the degree of relevance of the term of the tree structure with regard to the service with which the tree structure is associated. Such a representation allows an ontological analysis.

Once the tasks which the user must carry out have been determined, the natural-language analysis server 13 is then adapted to carry out a comparison among the terms contained in the expressions for which the analysis was used to determine the tasks with each of the terms of the tree structures (stage E32 in FIG. 2).

More specifically, for each expression used to determine a task, a service is selected from a comparison of the terms used in the expression and the terms of the tree structures. At the start of the comparison, each service has a score of zero. Then when a term of a structure coincides with a term of the expression, the score of the service for which the tree structure has a term coinciding with the isolated term is incremented by the elementary score associated with the term of the structure.

Thanks to the use of an ontology allowing the link to be made between an isolated term and at least one of the terms of the structure, it is not necessary for the isolated term and the term of the structure to be totally similar for there to be a correspondence. In fact, for example, the isolated term "news" (canonical form "news") may coincide with the term "information" of the structure through the advantageous use of an ontology describing their relation.

In this way, for each expression from which a task to be carried out has been determined, the server 13 selects the service with the highest overall score. The service selected in this way is potentially the most suitable to allow the user 12 to carry out the task since it has been chosen based on an expression used in the conversation.

In our example, four services have been selected respectively to allow Matthieu to carry out the tasks for which he is responsible. As shown in FIG. 3, the different services are:

"telephony service";
"SMS sending service";
"online ticket reservation service";
"online route finding service".
The telephony and SMS sending services can be carried out from applications available on the communication system 1. The ticket reservation and route finding services can be carried out from Internet sites accessible from the communication system 1.

Once the tasks are determined and the associated services are selected, it is also of interest to determine a suitable sequence in which the user 12 must carry out the tasks and launch the services knowing that the result associated with certain services may determine the running of other services.

To do this, the natural-language analysis server 13 is adapted to carry out a contextual analysis of the expressions used during the conversation (stage E33 in FIG. 2). In our example, this analysis determines, through the expressions "to check" and "if he hasn't got them", that the online ticket purchasing service only has to be launched if Philippe does not have the tickets. Likewise, the expression "afterwards" indicates that an SMS must be sent to Alain once it has been checked whether Philippe has the tickets or once Matthieu has purchased the tickets from an online purchasing service.

Once the sequence of the services is determined, the server 13 sends the items and the meta-data associated with the selected services to the instant messaging client 14 of the user 12 (stage E4 in FIG. 2). The items are then displayed on the interface of the messaging client, respecting the sequence determined (stage E5 in FIG. 2). The display can take the form of a status diagram 101.

Advantageously, the user 12 may, from their instant messaging client 14, modify the sequence of services proposed or replace certain services selected by other services likely to be launched and/or run from the communication system 1.

Advantageously, the user 12 may also trigger the launch and running of the different services. These services shall then be launched and run in sequence, respecting the order established in the sequence using the meta-data which will have been sent.

The result obtained by the completion of each service may be reused to launch a service for which the completion is scheduled later in the sequence.

In the mode described so far, the selection of a service was carried out only based on the expressions used during the conversation. However, among the list of services present in the reference system 15, several services may be carried out using close or equivalent Internet sites or using different applications available on the communication system 1 of the user 12.

For example, a concert ticket reservation service may be run from an Internet site of a theatre, from the site of a music group or via the site of a chain of music outlets. Likewise, a correspondent may be contacted by telephone using a traditional telephony service or via a voice over IP type service.

It may therefore be of interest to refine the selection based on the previously-saved preferences of the user 12.

To do this, the natural-language analysis server 13 can also be connected to a second database 16 containing user profiles. A user profile can advantageously include:
- a list of favourite Internet sites or pages from which the user 12 wishes to preferably consult information or carry out an action;
- a list of user contacts containing for each contact, among other things, the surname, first name and the different applications through which the contact can be reached (electronic mail, instant messaging, traditional telephony, telephony over IP, telephone conference, etc.) as well as the different information required to enter into communication with these contacts via the applications mentioned above;

In the conversation example shown in FIG. 3, the first telephone call service selected from the semantic analysis of the expressions used during the conversation can also be selected based on the preferences of the user 12. For example, if the user has specified in these preferences that they only wish to hold telephone conversations using a voice over IP application, the analysis server 13 will then select a telephony service which can be run from a voice over IP application.

Furthermore, if the telephone contact details for Philippe are contained in the user preferences, the meta-data associated with the telephony service selected may then advantageously be completed with these details. In this way, the user will not need to enter additional information to launch the telephony service from the instant messaging client 14.

Likewise, the analysis server may also consult the preferences of the user 12 stored previously to select a ticket reservation service specifically appreciated by the user 12. For example, the server 13 may select the URL of a site of a music outlet stored in the favourites of the user 12.

The use of a database 16 containing preferences of the user therefore allows customisation of the services offered to the user 12.

Although the different characteristics and advantages of the invention have been described in reference to a conversation held from instant messaging clients, the invention is not limited to a conversation of this kind. The invention may also, among other things, be applied when the conversation is a telephone conversation.

When the conversation is a voice conversation held from a telephone terminal 10, the communication system 1 records the conversation and sends the recording to the natural-language analysis server 13 at the end of the conversation. The natural-language analysis server 13 then carries out the semantic analysis, selection of services, contextual analysis and determination of the sequence of services stages, as described previously.

Furthermore, the establishment of a telephone conversation may trigger a display application (not shown) in the communication system 1. The analysis server 13 is then adapted to send the sequence of services determined to the application which is responsible for displaying the sequence on a graphical interface of the communication system 1. The display is made, for example, on the graphical interface of the computer 11 of the communication system 1.

The invention claimed is:

1. Method for determining a sequence of services linked to a conversation in which a user takes part from a communication system, wherein it includes, once the conversation is completed, the following stages:
   retrieval of all expression used during the conversation;
   semantic analysis of expressions retrieved;
   selection of a plurality of services from a list of services previously saved, based on at least said semantic analysis, with each service of said list able to be launched from said communication system;
   contextual analysis of the expressions used during the conversation;
   determination of a sequence of said services selected based on the contextual analysis;
   display on said communication system of the sequence of services selected.

2. Method according to claim 1, wherein the selection of a plurality of services also depends on at least one previously-saved preference of said user.

3. Method according to claim 1, wherein it also comprises a sequential stage for the running of said services selected based on the determined sequence.

4. Method according to claim 1, wherein, with the conversation being a telephone conversation and the expressions being used vocally, the expression retrieval stage comprises:
   the retrieval of a voice recording of the conversation;
   the transmission of the voice recording to a natural-language analysis server 13.

5. Method according to claim 1, wherein, with the conversation being held from at least one instant messaging client integrated into said communication system and with the conversation consisting of expressions entered and sent from, or received by respectively, said messaging client, the retrieval stage comprises the transmission, by said instant messaging client, of all the expressions entered or received which make up the conversation to a natural-language analysis server.

6. Method according to claim 5, wherein the sequence of services selected is displayed on the interface of said instant messaging client.

7. Communication system comprising means to allow a user to hold a conversation, wherein it also comprises:
- a means of storage for a list of services which can be launched from at least said communication system;
- a natural-language analysis server able to:
  - select a plurality of services from the list of services stored, based on at least one semantic analysis of all expressions used during the conversation;
  - determine a sequence of services selected based on a contextual analysis of all the expressions used during the conversation;
- means of displaying the sequence of the services selected.

8. Communication system according to claim 7, wherein it comprises a second storage means for storing preferences of said user, and in that said natural-language analysis server is also able to select said plurality of services depending on the preferences stored in the second storage means.

\* \* \* \* \*